United States Patent [19]

Funato et al.

[11] 4,399,717

[45] Aug. 23, 1983

[54] CHANGE-SPEED TRANSMISSION FOR WHEELED VEHICLES

[75] Inventors: Masayoshi Funato; Katunori Watanabe, both of Toyota, Japan

[73] Assignee: Toyota Jidosha Kogyo Kabushiki Kaisha, Toyota, Japan

[21] Appl. No.: 237,418

[22] Filed: Feb. 23, 1981

[30] Foreign Application Priority Data

Oct. 15, 1980 [JP] Japan .................... 55-144928

[51] Int. Cl.³ .............................................. F16H 3/38
[52] U.S. Cl. ....................................... 74/339; 74/359;
74/363; 74/375; 74/665 GA; 192/53 F;
192/48.5; 192/48.7
[58] Field of Search ................. 74/340, 355, 358, 359,
74/665 G, 694, 695, 700, 339, 362, 363, 374,
375, 665 GA; 192/53 F, 48.5, 48.7, 83

[56] References Cited

U.S. PATENT DOCUMENTS

| | | | |
|---|---|---|---|
| 2,333,161 | 11/1943 | Dunn | 74/363 X |
| 2,399,568 | 4/1946 | Peterson et al. | 74/363 X |
| 2,653,690 | 9/1953 | Saracchi | 74/340 X |
| 4,258,587 | 3/1981 | Morino | 74/700 |
| 4,299,140 | 11/1981 | Kako et al. | 74/665 G |
| 4,318,305 | 3/1982 | Wetrich et al. | 74/339 |

Primary Examiner—Leslie A. Braun
Assistant Examiner—Frank H. McKenzie, Jr.
Attorney, Agent, or Firm—Parkhurst & Oliff

[57] ABSTRACT

To selectively provide multi-speed two-wheel drive, multi-speed four-wheel drive and low-speed high-torque four-wheel drive, a change-speed gearing for a motor vehicle includes a rear output shaft coaxial with a front output shaft, a clutch hub fixed to the rear end portion of the front output shaft adjacent to the front end of the rear output shaft, a first hub sleeve axially slidable on the clutch hub to be shifted toward the front end of the rear output shaft to connect the front and rear output shafts, a speed-reduction driven gear freely rotatable on the front output shaft adjacent to the clutch hub and in meshing engagement with a counter gear fixed to a countershaft, and a second hub sleeve axially slidable on a hub portion of the driven gear to be shifted toward the clutch hub after the first hub sleeve is shifted.

5 Claims, 4 Drawing Figures

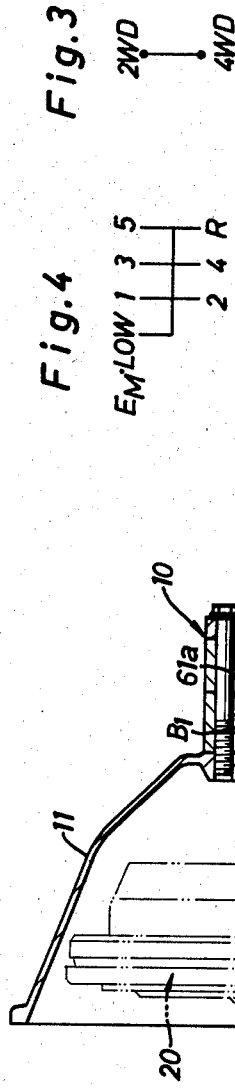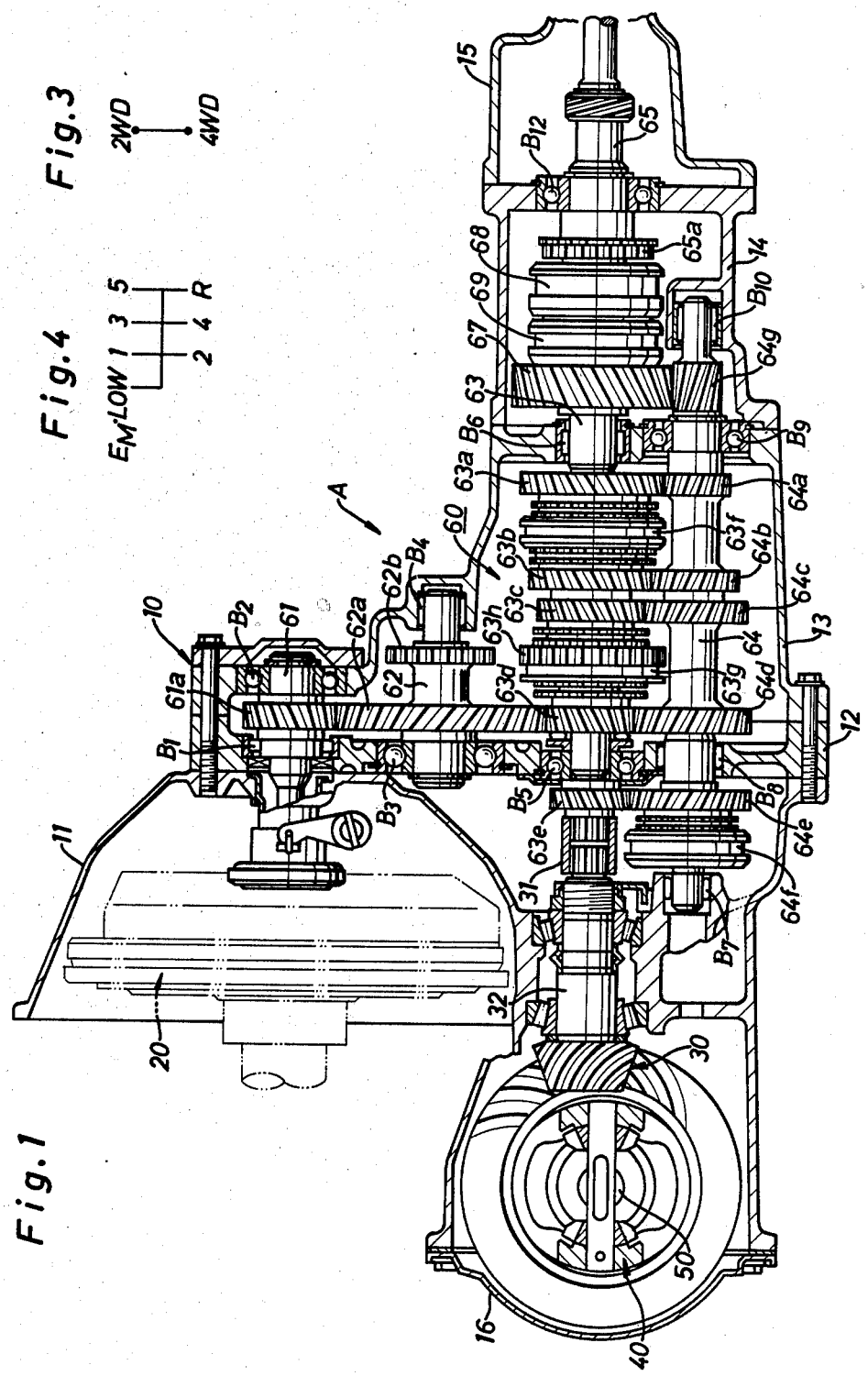

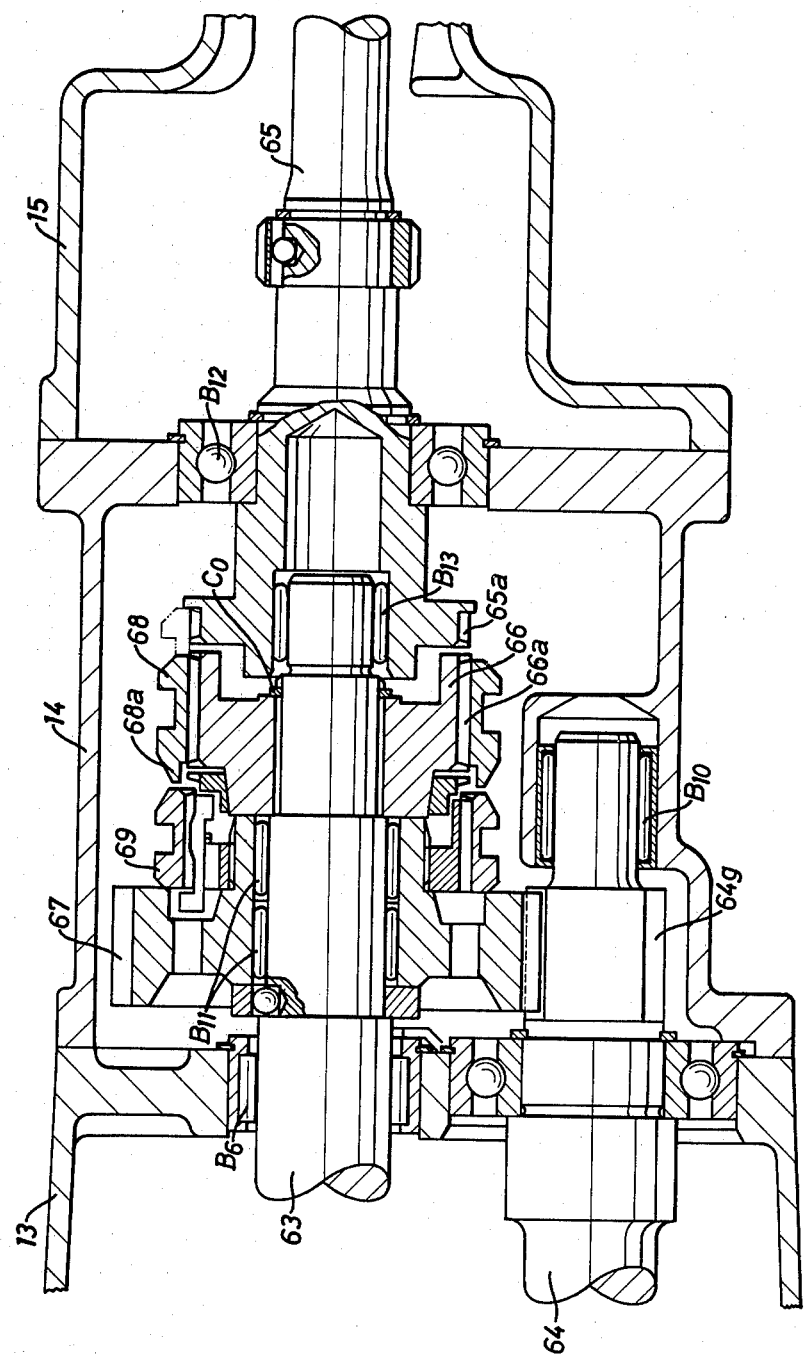

CHANGE-SPEED TRANSMISSION FOR WHEELED VEHICLES

BACKGROUND OF THE INVENTION

The present invention relates to a power transmission unit for wheeled vehicles, and more particularly to a change-speed gearing assembled within a power transmission unit for a motor vehicle of the front-engine, front-wheel drive type.

In recent years, various change-speed gearings have been proposed which are designed to selectively provide multi-speed two-wheel drive for economical driving of the vehicle and multi-speed four-wheel drive for driving of the vehicle on such off-roads as in mountain areas, coast areas and the like. For extrication from an emergency such as a sinking of road-wheels, it is required to develop a change-speed gearing capable of providing low-speed high-torque four-wheel drive. The requirement has hitherto been fulfilled by provision of a power transmission unit which includes a primary change-speed gearing and an auxiliary change-speed gearing mounted on an input member of the former gearing. In the power transmission unit, it is, however, necessary to provide large speed-reduction ratios in the auxiliary change-speed gearing. This results in high torque acting on power transmitting members of the primary change-speed gearing, which requires high strength in the power transmitting members. For the above reasons, the power transmission unit becomes large in size and heavy, and additionally a space for the auxiliary change-speed gearing is required.

SUMMARY OF THE INVENTION

It is, therefore, a primary object of the present invention to provide a change-speed gearing capable of selectively providing multi-speed two-wheel drive, multi-speed four-wheel drive and low-speed high-torque four-wheel drive without any provision of such a conventional auxiliary change-speed gearing as discussed above.

According to the present invention briefly summarized, the primary object is accomplished by provision of a change-speed gearing including a front output shaft and a countershaft arranged in parallel with an input shaft, and a plurality of change-speed gears on the front output shaft and in meshing engagement with respective counter gears on the countershaft to provide a selected speed ratio drive power train, the countershaft being drivingly connected to the input shaft to receive an input torque thereon. The change-speed gearing comprises a rear output shaft coaxial with the front output shaft, a clutch hub fixed to the rear end portion of the front output shaft and located adjacent to the front end of the rear output shaft, a first hub sleeve axially slidable on the clutch hub and arranged to be shifted toward the front end of the rear output shaft to connect the front and rear output shafts, a speed-reduction driven gear freely rotatable on the front output shaft adjacent to the clutch hub and being in meshing engagement with an additional counter gear fixed to the countershaft, and a second hub sleeve axially slidable on a hub portion of the driven gear and arranged to be shifted toward the clutch hub after the first hub sleeve is shifted.

Preferably, the first hub sleeve is integrally formed with an annular projection facing the rear end of the second hub sleeve, the first hub sleeve being arranged to be shifted by engagement with the second hub sleeve at the annular projection thereof when the second hub sleeve is forcibly shifted toward the clutch hub.

BRIEF DESCRIPTION OF THE DRAWINGS

Additional objects and advantages of the present invention will be more readily apparent from the following detailed description of a preferred embodiment thereof when taken together with the accompanying drawings, in which:

FIG. 1 is a sectional view of a power transmission unit provided therein with a change-speed gearing in accordance with the present invention;

FIG. 2 is an enlarged sectional view to clearly depict the rear portion of the change-speed gearing;

FIG. 3 illustrates a shift pattern of a transfer lever for selectively providing two-wheel drive and four-wheel drive; and FIG. 4 illustrates a shift pattern of a shift lever for providing multi-speed drive power trains.

DESCRIPTION OF THE PREFERRED EMBODIMENT

Referring now to the drawings, in particular to FIG. 1, there is illustrated a power transmission unit A which includes a change-speed gearing 60 in accordance with the present invention. The transmission unit A is secured to the rear end portion of an engine to be arranged along the fore-and-aft axis of a motor vehicle of the front-engine, front-wheel drive type. A housing assembly 10 for the unit A comprises a trans-axle casing 11 and a main transmission casing 13 which are fluid-tightly fitted to each other by way of an upright intermediate plate 12. The trans-axle casing 11 is rigidly secured at its front seating face to an upright rear seating face of a cylinder block of the engine and is shaped generally to conform with a friction clutch assembly 20 contained in the upper compartment thereof and to conform with a final drive gearing 30, a differential gear unit 40 and a pair of front axles 50 contained in the lower compartment thereof. The lower compartment of casing 11 is sealingly closed by a dome-shaped cover 16 to retain lubricating oil within the housing assembly 10.

The housing assembly 10 further comprises a sub-transmission casing 14 and an extension housing 15, the former casing 14 being secured at its front seating face to an upright rear seating face of main transmission casing 13, and the latter housing 15 being secured at its front seating face to an upright rear seating face of casing 14. Assembled within casings 13, 14 and housing 15 is the change-speed gearing 60 which includes an input shaft 61 in the form of an output shaft of clutch assembly 20, an idler shaft 62 located under the input shaft 61, a front output shaft 63 located under the idler shaft 62, and a countershaft 64 located substantially at the same height above the ground level as the front output shaft 63 and parallel with the same. In the figure, the countershaft 64 is, however, illustrated at a position lower than the output shaft 63 in order to clearly depict the meshing engagement of the gear transmission.

The input shaft 61 is rotatably supported by a pair of axially spaced bearings $B_1$ and $B_2$ respectively from the intermediate plate 12 and from the main transmission casing 13. The idler shaft 62 is supported by a pair of axially spaced bearings $B_3$ and $B_4$ respectively from the intermediate plate 12 and from the main transmission casing 13 and is formed with an idler gear 62a and a reverse driving gear 62b. The idler gear 62a is permanently meshed with a driving gear 61a on the input shaft 61. The front output shaft 63 is supported by a pair of axially spaced bearings $B_5$ and $B_6$ respectively carried on the intermediate plate 12 and the main transmission casing 13 and is coaxially connected at its front end to a drive pinion shaft 32 of final drive gearing 30 by means of a spline coupling 31. The front output shaft 63 is provided with first, second, third and fourth speed gears 63a, 63b, 63c and 63d rotatable thereon and with a fifth speed gear 63e splined thereon. The output shaft 63 is further provided thereon with a pair of synchronizers which are shifted by slide sleeves 63f and 63g respectively. In addition, the slide sleeve 63g is integrally provided with a reverse gear 63h which is arranged to be positioned in a common vertical plane with the reverse driving gear 62b when the synchronizer is in its neutral position. If a reverse idler gear (not shown) is shifted under the neutral condition of the synchronizer, the reverse idler gear is brought into engagement with the gears 62b and 63h to establish a reverse torque delivery path between the input shaft 61 and the front output shaft 63.

The countershaft 64 is supported by axially spaced bearings $B_7$, $B_8$, $B_9$ and $B_{10}$ respectively carried on transaxle casing 11, intermediate plate 12, main transmission casing 13 and sub-transmission casing 14. The countershaft 64 is integrally formed with four gears 64a, 64b, 64c and 64d of differing sizes which are permanently meshed with first, second, third and fourth speed gears 63a, 63b, 63c and 63d on the front output shaft 63. The countershaft 64 is also provided with a fifth gear 64e rotatable thereon and with a third synchronizer which is shifted by a slide sleeve 64f, the fifth gear 64e being meshed with the fifth speed gear 63e on output shaft 63.

As well seen in FIGS. 1 and 2, the change-speed gearing 60 further comprises a rear output shaft 65 coaxially arranged with the front output shaft 63, a clutch hub 66 splined on the rear end portion of output shaft 63, and a low speed driven gear 67 rotatable on the output shaft 63 by means of a pair of bearings $B_{11}$. The rear output shaft 65 is rotatably supported by a bearing $B_{12}$ and a metal bush with a sleeve yoke (not shown) respectively carried on the sub-transmission casing 14 and extension housing 15, and the rear end of front output shaft 63 is rotatably coupled with the front end of rear output shaft 65 by means of a bearing $B_{13}$. The front end of rear output shaft 65 is formed at its outer periphery with a spline 65a, and in addition, the rear output shaft 65 is connected to the rear axles (not shown) by way of a propeller shaft, a final drive gearing and a differential gear unit (not shown).

The clutch hub 66 is fixed in place on the front output shaft 63 by means of a retaining clip $C_0$ and is formed at its outer periphery with a spline 66a of which diameter and pitch are the same as those of the spline 65a of rear output shaft 65. A first hub sleeve 68 is axially slidably coupled over the spline 66a of clutch hub 66 to selectively provide two-wheel drive or four-wheel drive. The hub sleeve 68 is arranged to be shifted by a transfer lever (not shown) in the shift pattern shown in FIG. 3 to selectively connect the clutch hub 66 to the rear output shaft 65. The low speed driven gear 67 is permanently meshed with a low speed countergear 64g which is integrally formed on the countershaft 64, and a second hub sleeve 69 for a low speed is axially slidably assembled on the hub portion of driven gear 67 by way of a synchronizer. The second hub sleeve 69 is formed at its inner periphery with a spline of which diameter and pitch are the same as those of the inner spline of hub sleeve 68. The hub sleeve 69 acts to selectively connect the driven gear 67 to the clutch hub 66 when shifted by a shift lever (not shown) between a neutral position and an $E_M$.Low position of the shift pattern shown in FIG. 4.

When the first hub sleeve 68 is shifted rearwards to its 4WD position from its 2WD position as shown by an imaginary line in FIG. 2, the connection between clutch hub 66 and rear output shaft 65 is completed, and subsequently the driven gear 67 is connected to the clutch hub 66 upon rearward movement of the second hub sleeve 69 from its neutral position to its $E_M$.Low position. In this embodiment, the first hub sleeve 68 is provided at its front end with an annular projection 68a which extends toward the rear end of sleeve 69. In the shifting operation, if the second hub sleeve 69 is shifted rearwards by a large shifting force against the first hub sleeve 68 in its 2WD position, the second hub sleeve 69 will abut against the annular projection 68a to forcibly shift the sleeve 68 to its 4WD position so as to effect the connection between the driven gear 67 and the clutch hub 66.

When conditions are such that the transfer lever is in its 2WD position in FIG. 3 and that the shift lever is selectively shifted to respective positions of the shift pattern in FIG. 4 excluding the $E_M$.Low position, the first hub sleeve 68 is held in its 2WD position as shown in FIG. 2, so that each forward drive gear train for the first through fifth speeds and a rearward drive gear train may be selectively established in response to shifting operation of the shift lever. During the above operation, drive power from the engine is given to input shaft 61 through clutch assembly 20 and then transmitted to the front output shaft 63 through the input gear train. The drive power is further transmitted to the front axles 50 by way of the final drive gearing 30 and differential gear unit 40 to drive the two front road-wheels of the vehicle. In this instance, the drive power from the engine may not be transmitted to the rear output shaft 65 owing to disengagement of clutch hub 66 from rear output shaft 65. In addition, even if the shift lever is erroneously shifted by a normal shifting force to the $E_M$.Low position in FIG. 4, rearward movement of the second hub sleeve 69 will be restricted by engagement with the hub sleeve 68 in its 2WD position to prevent the erroneous shifting operation of the shift lever toward the $E_M$.Low position.

When conditions are such that the transfer lever is shifted to its 4WD position in FIG. 3 and that the shift lever is shifted to respective positions of the shift pattern in FIG. 4 excluding the $E_M$.Low position, the first hub sleeve 68 is held in its 4WD position as shown by the imaginary line in FIG. 2, so that each forward drive gear train for the first through fifth speeds and a rearward drive gear train may be selectively established in response to shifting operation of the shift lever. This results in power transmission from input shaft 61 to the front and rear output shafts 63 and 65 through the respective input gear trains. Thus, the two front road-wheels are driven by the power transmitted thereto through the final drive gearing 30, differential gear unit 40 and front axles 50, while the two rear road-wheels are driven by the power transmitted thereto through the propeller shaft, final drive gearing, differential gear unit and rear axles.

To provide four-wheel drive with high power-torque at a low speed, the transfer lever is shifted to its 4WD position in FIG. 3, and the shift lever is shifted to its $E_M$.Low position. Under this condition, the first hub sleeve 68 is held in its 4 WD position as shown by the imaginary line in FIG. 2, each forward drive gear train for the respective speeds and a rearward drive gear train are maintained in their neutral positions, and the second hub sleeve 69 is shifted rearwards to connect the low speed driven gear 67 to the clutch hub 66 on front output shaft 63. Thus, the power given to input shaft 61 is transmitted to the countershaft 64 through the input gear train including gears 61a, 62a, 63d and 64d, and in turn, conveyed to the clutch hub 66 by way of the low speed counter gear 64g, driven gear 67 and sleeve 69. Then, the power given to clutch hub 66 is transmitted to the front output shaft 63 and to the rear output shaft 65 through hub sleeve 68. Finally, the power is transmitted to the front axles 50 from the front output shaft 63, while the power is also transmitted to the rear axles from the rear output shaft 65 thereby to drive four road-wheels of the vehicle with a high power-torque at a low speed. The low-speed high-torque four-wheel drive can be provided when the shift lever is shifted by a large shifting force to the $E_M$.Low position even if the transfer lever is in its 2WD position in FIG. 3. In this shifting operation, the hub sleeve 68 is forcibly shifted to its 4WD position by engagement with the second hub sleeve 69 at its annular projection 68a to provide the low-speed high-torque four-wheel drive. In the occurrence of such an emergency as a sinking of road-wheels, the low-speed high-torque four-wheel drive is helpful for extrication from the emergency, and the normal four-wheel drive at a desired speed is obtainable only by return shifting of the shift lever after extrication from the emergency.

As described above in detail, it will be understood that the change-speed gearing 60 is useful to selectively provide multi-speed two-wheel drive, multi-speed four-wheel drive, and low-speed high-torque four-wheel drive for the emergency. With the change-speed gearing 60, each of the change-speed gears does not receive any high torque because the speed-reduction gears 64g and 67 act to convert the engine power into high torque suitable for extrication from the emergency. It is, therefore, unnecessary to enhance the strength of the change-speed gears higher than normal strength. Furthermore, the power transmitting members from the clutch hub 66 to the front and rear axles do not receive any high torque because the high power-torque is converted into a split torque acting on the front and rear output shafts 63 and 65. It is also unnecessary to enhance the strength of the power transmitting members higher than normal strength. For the above reasons, the change-speed gearing 60 can be constructed in a small size and a light weight. Another advantage is that the change-speed gearing 60 can be adapted to a conventional change-speed gearing for a motor vehicle of the front-engine, front-wheel drive type.

Although a specific embodiment of the present invention has been shown and described, it is obvious that many modifications thereof are possible. The invention, therefore, it not intended to be restricted to the exact showing of the drawings and description thereof, but is considered to include reasonable and obvious equivalents.

What is claimed is:

1. A power transmission unit having a change-speed gearing including a front output shaft and a countershaft arranged in parallel with an input shaft, and a plurality of change-speed gears on said front output shaft and in meshing engagement with respective counter gears on said countershaft to provide a selected speed-ratio drive power train, said countershaft being drivingly connected to said input shaft to receive an input torque thereon, comprising:

a rear output shaft coaxially arranged with said front output shaft, said rear output shaft having a front end portion provided at its outer periphery with a spline and rotatably coupled with the rear end of said front output shaft;

a clutch hub fixedly mounted on said front output shaft and located at one side thereof adjacent to the front end portion of said rear output shaft, said clutch hub being provided at its outer periphery with a spline corresponding with the outer spline of said rear output shaft;

a first hub sleeve axially slidably coupled over said clutch hub and being provided at its inner periphery with a spline in engagement with the outer spline of said clutch hub, said first hub sleeve capable of being brought into engagement with the outer spline of said rear output shaft during the shifting operation thereof toward said rear output shaft, to thereby provide a torque transmission between said front and rear output shafts;

a speed-reduction driven gear rotatably mounted on said front output shaft and located adjacent to the other side of said clutch hub, said driven gear being provided with a hub portion confronting with said clutch hub and being in meshing engagement with an additional counter gear on said countershaft to thereby provide a high power torque transmission from said countershaft to both said front and rear output shafts at a lower speed than that of the selected speed-ratio drive power train; and a second hub sleeve axially slidably coupled over the hub portion of said driven gear by means of a spline connection, said second hub sleeve being provided at its inner periphery with a spline corresponding with the inner spline of said first hub sleeve and capable of being brought into engagement with the outer spline of said clutch hub during the shifting operation thereof toward said clutch hub to effect the high power torque transmission when said first hub sleeve is engaged with the outer spline of said rear output shaft.

2. A power transmission unit as claimed in claim 1, wherein said first hub sleeve is provided at one end thereof with an annular projection which is capable of being brought into engagement with a rear end of said second hub sleeve, the first hub sleeve thereby capable of being slid into engagement with the rear output shaft through a force applied to the second hub sleeve.

3. A power transmission unit as claimed in claim 1 or 2, wherein said second hub sleeve is arranged to be shifted toward said clutch hub when all said change-speed gears are freely rotatable from said front output shaft.

4. A power transmission unit as claimed in claim 1, wherein said clutch hub, said first and second hub sleeves, and said speed-reduction driven gear are arranged within a subtransmission casing secured to a main transmission casing in which said change-speed gearing is assembled.

5. A power transmission unit as claimed in claim 1, wherein said second hub sleeve is coupled over the hub portion of said driven gear by means of a synchronizer.

* * * * *